UNITED STATES PATENT OFFICE.

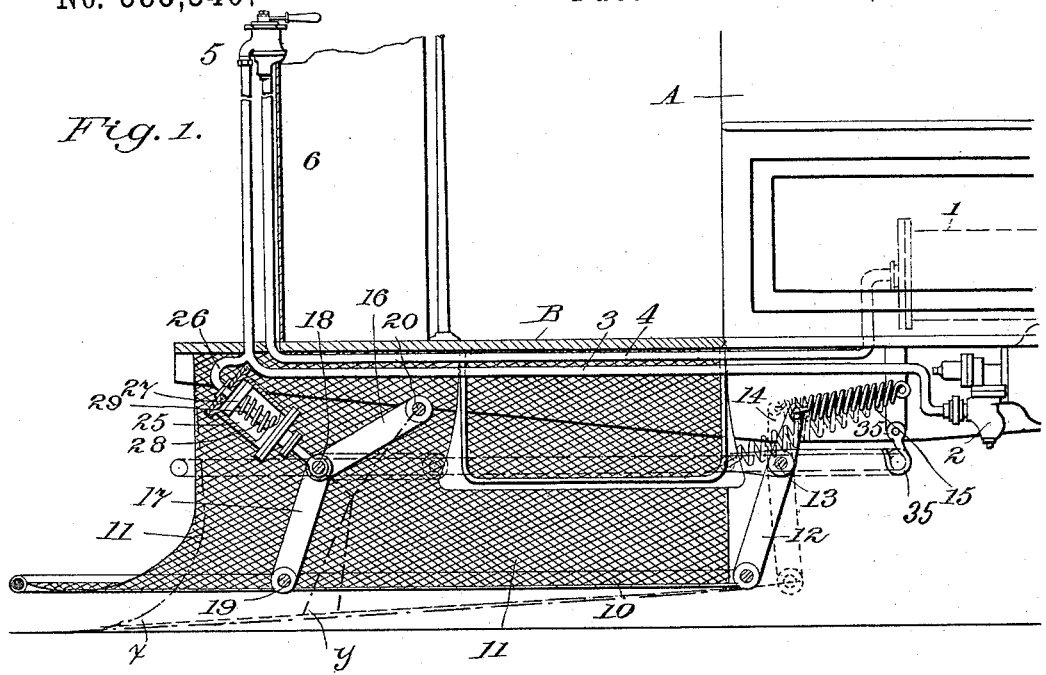
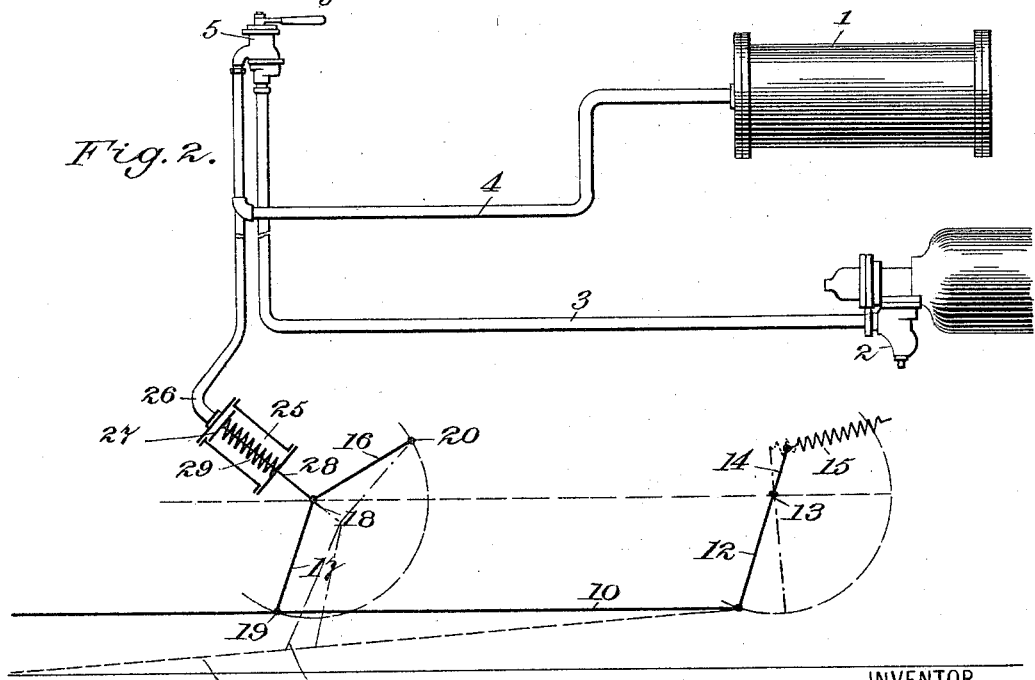

WALTER H. KNIGHT, OF NEW BRIGHTON, NEW YORK.

CAR-FENDER.

SPECIFICATION forming part of Letters Patent No. 585,340, dated June 29, 1897.

Application filed May 7, 1896. Serial No. 590,615. (No model.)

*To all whom it may concern:*

Be it known that I, WALTER H. KNIGHT, a citizen of the United States, residing at New Brighton, in the county of Richmond and State of New York, have invented certain new and useful Improvements in Car-Fenders, of which the following is a specification.

The prime object of my invention is to provide a car-fender which will be automatically thrown into operative position by the application of the car-brake in making an emergency stop.

Another object of my invention is to so mount the car-fender that when it is struck by a person or other obstruction in the road the fender will yield rearwardly and in so yielding will automatically lower closely to the track to facilitate picking up the obstruction.

My invention is particularly designed to be applied to cars equipped with fluid-pressure brakes; and in this application of the invention I prefer to so arrange the fender-controlling mechanism that the fender will only be thrown down into close proximity to the track when the controlling-lever of the brake is thrown into position to make an emergency stop, thus allowing the motorman to use the brake under ordinary circumstances without altering the position of the fender.

In the particular application of my invention shown in the accompanying drawings the fender-frame is supported at the rear by suitable parallel links and at the forward end by parallel toggle-links, said links being suspended from the car-body. Directly beneath the platform of the car I provide a fluid-pressure cylinder in which operates a piston surrounded by a strong spiral spring connected to the pivot-bar of the front toggle-links. The fluid-pressure cylinder communicates, through a suitable pipe, with the engineer's valve, which throws it into communication with the air-reservoir when the brakes are applied for an emergency stop.

In the accompanying drawings, which form a part of this specification, Figure 1 is a detail side elevation of the forward part of a car having my improved fender applied thereto. Fig. 2 is a detail side elevation, partly diagrammatical, of the same with the parts of the car omitted.

A is the car-body, and B is the platform thereof.

1 is the air-reservoir, and 2 the air-brake valve, of an ordinary fluid-pressure brake system.

3 and 4 are air-pipes communicating between the reservoir 1 and valve 2 through the engineer's valve 5, which is mounted upon the dash 6.

10 is the main fender-frame, designed to extend forwardly on both sides of the car in front of the wheels and bent around in front of the platform. This frame may be of any suitable construction or shape.

11 is the catch-net, supported in the forward part of the fender and attached to the platform.

12 are parallel links attached to the rear ends of the fender-bar and pivoted at 13 to the under frame of the car-body. The links 12 have heels or extensions 14 extending beyond the pivots 13, and connecting the heels or extensions 14 with the frame of the car are stout spiral springs 15, tending to hold the fender in position parallel with the track.

16 17 are toggle-links pivoted together by the pivot-rod 18 and connected, respectively, at the pivot-points 19 and 20 with the fender-frame and car-body.

25 is a fluid-pressure cylinder supported beneath the car-platform and communicating through a pipe 26 with the engineer's valve 5.

27 is a piston working in cylinder 25 and carrying a piston-rod 28, which is connected with the pivot-rod 18 of the toggle-links.

29 is a strong spiral spring surrounding the rod 28 and confined between the piston 27 and the lower head of the cylinder 25. The springs 29 and 15 coöperate to hold the fender-frame projected slightly in front of the car-platform parallel with the track with a yielding pressure, so that when an obstruction is encountered the frame will give rearwardly.

35 is a hook mounted on the car-frame and adapted to engage the fender-frame for holding it up in the position shown in dotted lines in Fig. 1 when the fender is not in use.

The operation of the device can be briefly described as follows: The fender, being in the position shown in full lines in Figs. 1 and 2, encounters an obstruction. The frame will immediately assume the rearward-inclined position shown by the dotted lines *y* by reason of the yielding of the springs 15 and 29, the toggle-links 17 allowing the forward end of the frame to be lowered more than the rear end. This facilitates the picking up of the object which has been struck. If the motorman has seen the person or other object on the track before it is struck, he applies the brakes for an emergency stop. This will throw the air into the cylinder 25 and force the fender-frame down into the position shown in dotted lines *x* in readiness to pick up the object.

The important feature of my invention lies in the fact that fenders cannot be normally supported nearer than eighteen inches from the track on account of the vibrations of the car-body. It will therefore be apparent that the fender can by my improvement be supported a safe distance from the track and at the proper moment be thrown down almost in contact with the track for picking up a person.

Having thus described my invention, what I claim, and desire to secure by Letters Patent, is—

1. The combination of a car-fender, and suitable springs for holding the fender normally elevated above the track, with a fluid-cylinder, a piston in the cylinder connected with the fender, and a valve for controlling admission of fluid to the cylinder; whereby the fender will be automatically lowered to pick up an obstruction when it is struck and can be thrown down at will by the operation of the valve, substantially as set forth.

2. The combination of a car, a fender, links pivotally attached to the car and fender for supporting the latter, springs for holding the fender in normal position, a fluid-cylinder, a piston working therein and connected with the fender, a fluid-reservoir, and a valve controlling communication between the reservoir and cylinder, as set forth.

3. The combination of a car, a fender, parallel links connecting the rear of fender to the car-body, toggle-links connecting the forward part of the fender with the car-body, and springs for holding the fender normally forward and slightly elevated, whereby the forward part of the fender will be lowered more that the rear part and the fender will be automatically lowered when struck, as set forth.

4. The combination of a car, a fender, parallel links connecting the rear of the fender to the car-body, toggle-links connecting the forward part of the fender to the car-body, springs for holding the fender in normal position, and an operating device connected with the toggle-links, as set forth.

5. The combination of the car-body, a fluid-pressure brake comprising a reservoir and braking-cylinder, a fender suitably supported upon links suspended from the car-body, a fender-controlling fluid-cylinder provided with a piston suitably connected with the fender, and an engineer's valve controlling the brake and fender and adapted to operate the brakes alone in the ordinary running of the car and to throw the fender into operative position when making emergency stop, substantially as set forth.

6. The combination of a car-body, the fender, the parallel links connecting the rear part of the fender with the car-body, heels or extensions formed on said links, springs connecting the heels or extensions with the car-frame, toggle-links connecting the forward part of the fender with the car-body, a fluid-cylinder, a piston working in said cylinder, a rod connecting the piston with the toggle-joint of said toggle-links, a spring surrounding the rod, a fluid-reservoir, and a valve controlling communication between the reservoir and cylinder, as set forth.

WALTER H. KNIGHT.

Witnesses:
M. V. BIDGOOD,
J. GREEN.